(12) United States Patent
Buvat et al.

(10) Patent No.: US 11,124,592 B2
(45) Date of Patent: Sep. 21, 2021

(54) FLUORINATED PROTON-CONDUCTING INORGANIC PARTICLES AND USE OF SAID PARTICLES IN PROTON-CONDUCTING MEMBRANES

(71) Applicant: COMMISSARIAT À L'ÉNERGIE ATOMIQUE ET AUX ÉNERGIES ALTERNATIVES, Paris (FR)

(72) Inventors: Pierrick Buvat, Montbazon (FR); Janick Bigarré, Tours (FR); Julien Cellier, Veigne (FR); Delphine Dru, Sorigny (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 153 days.

(21) Appl. No.: 16/480,505

(22) PCT Filed: Jan. 24, 2018

(86) PCT No.: PCT/FR2018/050163
§ 371 (c)(1),
(2) Date: Jul. 24, 2019

(87) PCT Pub. No.: WO2018/138434
PCT Pub. Date: Aug. 2, 2018

(65) Prior Publication Data
US 2020/0071445 A1 Mar. 5, 2020

(30) Foreign Application Priority Data
Jan. 25, 2017 (FR) .................................... 1750607

(51) Int. Cl.
| | |
|---|---|
| *C08F 292/00* | (2006.01) |
| *C08J 5/22* | (2006.01) |
| *H01M 8/1037* | (2016.01) |
| *H01M 8/1039* | (2016.01) |
| *H01M 8/1072* | (2016.01) |
| *B01D 67/00* | (2006.01) |
| *B01D 69/14* | (2006.01) |
| *B01D 71/32* | (2006.01) |
| *H01M 8/1018* | (2016.01) |

(52) U.S. Cl.
CPC ............ *C08F 292/00* (2013.01); *C08J 5/2237* (2013.01); *H01M 8/1037* (2013.01); *H01M 8/1039* (2013.01); *H01M 8/1072* (2013.01); *B01D 67/0079* (2013.01); *B01D 69/148* (2013.01); *B01D 71/32* (2013.01); *C08F 2438/01* (2013.01); *C08J 2325/18* (2013.01); *C08J 2327/16* (2013.01); *C08J 2327/20* (2013.01); *H01M 2008/1095* (2013.01); *H01M 2300/0082* (2013.01)

(58) Field of Classification Search
CPC ..... H01M 8/1004; C08F 12/30; C08F 292/00; C08J 5/2237; C08J 5/2218; C08J 5/2225; C08J 5/2243; C08J 2325/08; C08J 2325/16; C08J 2325/18; C08J 2327/16
See application file for complete search history.

(56) References Cited

U.S. PATENT DOCUMENTS

| | | | |
|---|---|---|---|
| 6,210,790 B1 * | 4/2001 | Crivello ................ | C08F 230/08 428/325 |
| 9,120,916 B1 * | 9/2015 | Swarup ............... | C08G 18/6229 |
| 9,434,794 B2 * | 9/2016 | Hishikawa ............... | C08F 2/38 |
| 9,450,223 B2 * | 9/2016 | Song ..................... | H01M 4/622 |
| 2005/0053818 A1 * | 3/2005 | St-Arnaud ........... | B01D 69/141 429/431 |
| 2005/0227135 A1 | 10/2005 | Chalkova et al. | |
| 2005/0244697 A1 | 11/2005 | Taft, III et al. | |
| 2008/0233451 A1 * | 9/2008 | Hong .................. | H01M 8/1023 429/492 |
| 2010/0196786 A1 | 8/2010 | Niepceron et al. | |
| 2013/0005881 A1 * | 1/2013 | Yang ....................... | C08L 51/10 524/145 |
| 2013/0199030 A1 * | 8/2013 | Song .................... | H01M 50/403 29/623.5 |
| 2017/0226381 A1 * | 8/2017 | Lan ...................... | C09K 3/1436 |
| 2019/0097242 A1 | 3/2019 | Buvat et al. | |
| 2019/0109329 A1 | 4/2019 | Buvat et al. | |
| 2019/0169459 A1 * | 6/2019 | Shaffer ............... | C08F 283/006 |
| 2019/0177461 A1 | 6/2019 | Buvat et al. | |
| 2019/0345301 A1 * | 11/2019 | Buvat .................... | C08J 5/2237 |

FOREIGN PATENT DOCUMENTS

| | | | |
|---|---|---|---|
| CN | 108250371 A | * | 7/2018 |
| FR | 2917733 B1 | | 5/2011 |

OTHER PUBLICATIONS

Machine translation of CN 108250371 (no date).*
Yin, Quanyi et al. "Nitroxide-mediated polymerization of pentafluorostyrene initiated by PS-DPEN through the surface of APTMS modified fumed silica: towards functional nanohybrids" In: RSC Advances, 2016, vol. 6, No. 63 pp. 58260-58267.
Search Report for French Application No. 1750607 dated Sep. 19, 2017.
International Search Report for PCT/FR2018/050163 dated Mar. 22, 2018.
Written Opinion for PCT/FR2018/050163 dated Mar. 22, 2018.

* cited by examiner

*Primary Examiner* — Amanda C. Walke
(74) *Attorney, Agent, or Firm* — Pearne & Gordon LLP

(57) ABSTRACT

Silica particles bonded to polymer chains consisting of at least one polymer comprising at least one fluorinated styrene repeating unit comprising at least one proton-conducting group, optionally in the form of a salt, the bonding between the particles and each of the chains being carried out by an organic spacer group.

22 Claims, No Drawings

FLUORINATED PROTON-CONDUCTING INORGANIC PARTICLES AND USE OF SAID PARTICLES IN PROTON-CONDUCTING MEMBRANES

CROSS-REFERENCE TO RELATED APPLICATIONS

This is a National Stage application of PCT international application PCT/FR2018/050163, filed on Jan. 24, 2018, which claims the priority of French Patent Application No. 17 50607, filed Jan. 25, 2017, both of which are incorporated herein by reference in their entireties.

TECHNICAL FIELD

This invention relates to proton-conducting inorganic particles grafted by polymer chains constituted of at least one specific polymer of which the hydrophilic-hydrophobic nature is controlled by the choice of the repetitive units that form the polymer.

This invention also relates to methods for the preparation thereof as well as the use thereof for the forming of fuel cell membranes.

These particles have the characteristic of having an ion exchange capacity that is particularly high, due to the fact that they comprise proton-exchanging groups supplied via the grafted polymer chains. Therefore, these particles have their application in the elaboration of proton-conducting material, in particular of materials intended to enter into the constitution of proton-conducting membranes, for example, for fuel cells, such as the cells that operate with $H_2$/air or $H_2/O_2$ (known as the abbreviation PEMFC meaning "Proton Exchange Membrane Fuel Cell") or operating with methanol/air (known as the abbreviation DMFC meaning "Direct Methanol Fuel Cell"), for electrolysers, such as sodium-chloride electrolysers, PEMEC electrolysers (PEMEC meaning "Proton Exchange Membrane Electrolysis Cell") for electrolyser flow batteries (referred to as "batteries redox flow") or for water purification devices.

Thus, the technical field of the invention can be defined, generally, as that of proton-conducting particles and of the materials containing them.

Even more generally, the invention relates to the field of proton-conducting particles used in the constitution of conducting membranes, in particular, for fuel cells.

PRIOR ART

A fuel cell is an electrochemical generator that converts the chemical energy of an oxidation reaction of a fuel in the presence of an oxidiser into electrical energy.

Generally, a fuel cell comprises a plurality of electrochemical cells mounted in series, with each cell comprising two electrodes of opposite polarity separated by a proton-exchanging membrane that act as a solid electrolyte.

The membrane provides the passage to the cathode of the protons formed during the oxidation of the fuel at the anode.

The membranes structure the core of the cell and must, consequently, have good performances in terms of proton conduction, as well as low permeability to reactant gases ($H_2$/air or $H_2/O_2$ for PEMFC cells and methanol/air for DMFC cells). The properties of the materials that form the membranes are substantially thermal stability, resistance to hydrolysis and to oxidation as well as a certain mechanical flexibility.

Commonly used membranes that satisfy these requirements are membranes obtained from polymers that belong, for example, to the family of polysulfones, of polyetherketones, of polyphenylenes. However, it has been observed that these non-fluorinated polymers break down relatively quickly in a fuel cell environment and their service life remains, for the moment, insufficient for the PEMFC application.

Membranes that have more substantial properties in terms of service life are membranes obtained from polymers formed from a main perfluorinated linear chain and from side chains carrying an acid group, such as sulphonic acid groups. Among the most well known, mention can be made of the membranes marketed under the name NAFION® by the company Dupont de Nemours or under the name Dow®, FLEMION® or Aciplex by the companies Dow Chemicals and Asahi Glass. These membranes have good electrochemical performances and an interesting service life but nevertheless are insufficient for PEMFC applications. In addition, their cost (more than 500 euros/m$^2$) remains prohibitive for marketing. For DMFC applications, they have a high permeability to methanol, which also limits their use with this type of fuel. What is more, the monomers that form them have a structure of the hydrophilic/hydrophobic type, which makes them particularly sensitive to the phenomena of hydration and dehydration. Thus, the operating temperature is typically around 80° C., since above that the hydration instabilities prematurely age the membranes.

There is therefore a real need to stabilise the proton conduction of these membranes around 100° C. To do this, certain authors have directed their efforts to developing more complex membranes that comprise in addition to a matrix made of a conducting organic polymer, compounds or particles that can provide additional conductivity. When the particles are mineral particles, these membranes are designated in particular by the terminology "inorganic-organic hybrid membranes".

Thus, patents US 2005/0227135 and US 2005/0244697 describe the introduction of hydrophilic inorganic compounds, in order to improve the level of hydration of the membranes at high temperature (with the inorganic compounds being agglomerates of particles of metal oxides or of metal phosphates for US 2005/0227135 or of cation-exchanging materials with a clay base for US 2005/0244697).

However, although these formulations of composite membranes improve the proton conductivities of the membranes around 100° C., they remain insufficient for satisfying the operating criteria of a fuel cell at these temperatures. What is more, the polymer matrices that receive these inorganic compounds already have a good level of proton conduction.

Also proposed, in FR 2 917 733, are inorganic particles (such as particles of silica) grafted, covalently, by proton-conducting polymers, such as poly-sodium 4-vinylbenzene-sulfonate. These particles are then incorporated into polymeric matrices in order to form a composite material that can form a proton-conducting membrane for fuel cells.

These particles have an excellent ion exchange capacity. They also have the particularity of being grafted by water-soluble polymers. Thus, placed in an aqueous phase, the particles form a dispersion on a nanometric scale, of which the grafted polymer chain are solubilised (in other terms, the particles are solvated by the polymer chains), whereby the mixture of the particles and of the aqueous phase visually have the form of a transparent solution. In a fuel cell environment that involves an aqueous medium for the transfer of protons, such particles cannot be used as such to form a membrane but must be used in the form of composite materials, wherein they form a filler trapped in a polymeric matrix. In operation in the fuel cell, the membrane is used as a bridge for the transfer of protons between the anode compartment and the cathode compartment, with the transfer being provided by proton-conducting groups, such as —$SO_3H$, —$PO_3H_2$ or —$CO_2H$ groups. In order to reach substantial conductivities, it is suitable that the membrane be sufficiently hydrated, in order to form a hydrophilic network within the latter. Then, the transfer of protons is accompanied by a phenomenon of electroosmosis leading to the migration of molecules of water from the anode compartment to the cathode compartment. This water is added to that which is created on the cathode compartment, during the reduction reactions of the oxygen. This results in a water concentration gradient between the cathode compartment, rich in water and the anode compartment, poor in water, which generates an osmotic pressure leading to transfers of water from the cathode compartment to the anode compartment. During these transfers, the polymers grafted on the surface of the particles can be led to be solubilised. In this case, the transfers of water between the anode and cathode compartments generate a driving force within the particles that can, despite the solid phase formed by the inorganic material comprising the core of the particles, cause them to migrate to the surface of the membrane thus leading to a depletion of the latter and, in time, to a decrease in conductivity performance of the latter.

The same mechanisms are at play in electrolysers, with the additional particularity that, in such devices, the membranes are entirely immersed in an aqueous phase, which can amplify the phenomenon of elution of the particles contained in the membranes.

Also, there is therefore a real need in terms of proton-conducting particles that can have both good proton conduction while still having less mobility when they are used in proton-conducting membranes. In other terms, there is a need for proton-conducting particles that are not subject to a risk of elution in a context of operating in an aqueous medium, such as the case of fuel cells and of electrolysers.

DISCLOSURE OF THE INVENTION

Thus, the invention relates to particles of silica bonded to polymer chains constituted of at least one polymer comprising at least one fluorinated styrenic repetitive unit carrying at least one proton-conducting group, optionally in the form of a salt, with the bond between said particles and each one of these chains being carried out via at least one organic spacer group.

Thanks to the grafting of the polymer chains mentioned hereinabove, the silica particles can have a substantial ion exchange capacity (linked directly to the number of proton-exchanging acid groups) and are not subject to the phenomenon of solubilisation or even elution, when they are subjected to an aqueous environment, dues to the fact that the polymer chains with a specific fluorinated polymer base have a non-water-soluble nature.

Furthermore, the particles in accordance with the invention have, contrary to the particles of prior art, less water swelling or expansion (said swelling can be responsible for an accelerated ageing phenomenon). In other terms, the particles in accordance with the invention have a decrease on the water regain.

According to the invention, the silica particles are bonded, via organic spacer groups, to specific polymer chains. This means, in other terms, that each one of the polymer chains is grafted to a particle via at least one organic spacer group, which means, in other words, that the organic spacer group is covalently bonded by one of its ends to a particle and, by another of its ends, is bonded, covalently, to a polymer chain.

According to another possible formulation, if $Y^1$ is used to refer to the fluorinated styrenic repetitive unit or units carrying at least one proton-conducting group, optionally in the form of a salt and $X'$ to an organic spacer group, the invention could also be defined as being particles bonded, covalently, to grafts of the following formula:

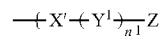

$n^1$ corresponding to the repetition number of the repetitive unit $Y^1$ between brackets, with this repetition number being a positive number at least equal to 2, for example, ranging from 2 to 3000, Z is an end-group, for example, a halogen atom, such as a chlorine atom, with the bracket indicating that the group $X'$ is directly covalently bonded to a particle of silicon.

It is specified that, when the polymer comprises several types of repetitive units $Y^1$, the repetitive units $Y^1$ can be distributed randomly, in alternation or in sequence, which means respectively, in other terms, that the repetitive units $Y^1$ are randomly distributed in the polymer, the repetitive units $Y^1$ are alternating in the polymer or the repetitive units $Y^1$ are distributed in the form of blocks (namely, a block of a type of repetitive unit $Y^1$ and a block of another type of repetitive unit $Y^1$, etc) in the polymer.

Before going into further detail in this description, we shall state the following definitions.

The term polymer means, conventionally, in terms of the invention, a compound formed by the chaining of one or several repetitive units (with the denomination copolymer able to be used when the polymer comprises several types of repetitive units).

The term repetitive unit means, conventionally, in terms of the invention, a bivalent organic group (i.e. a group forming a bridge) coming from a monomer after polymerisation of the latter.

In the polymer that comprises at least one fluorinated styrenic repetitive unit carrying at least one proton-conducting group, optionally in the form of a salt, said fluorinated styrenic repetitive unit or units can have the following formula (I):

$Z^1$ corresponds to a fluorinated phenylene group; and
$E^1$ corresponds to a single bond or an organic spacer group;
$E^2$ corresponds to a proton-conducting group, optionally in the form of a salt, such as a sulphonic acid group, a phosphonic acid group or a carboxylic acid group.

According to an alternative, $E^2$ can be bonded directly to $Z^1$ and, more specifically, to a carbon atom of the fluorinated phenylene group, when $E^1$ is a single bond. For example, $E^2$ can be located in a para position on this fluorinated phenylene group.

According to another alternative, $E^2$ can be bonded to $Z^1$ via an organic spacer group $E^1$, itself bonded to a carbon atom of the fluorinated phenylene group, for example, in para position on this fluorinated phenylene group.

$E^1$, when it is an organic spacer group, can be an alkylene group, a —S-alkylene-group or an —O-alkylene group (in these latter two cases, the S atom and the O atom being directly bonded to the fluorinated phenylene group), said alkylene groups are able to comprise from 1 to 4 carbon atoms, such as a methylene group, an ethylene group, an n-propylene group, an n-butylene group.

More specifically, $E^1$, when it is an organic spacer group, can be an —O-propylene group having the following formula (II):

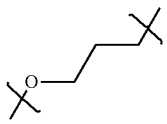

(II)

with the bracket on the oxygen atom indicating the location by which the oxygen atom is bonded to the fluorinated phenylene group and the bracket on the last carbon atom indicating that this carbon atom is bonded to the group $E^2$.

More specifically, $E^1$, when it is an organic spacer group, can be an S-propylene group having the following formula (III):

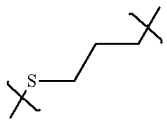

(III)

with the bracket on the sulphur atom indicating the location by which the sulfur atom is bonded to the fluorinated phenylene group and with the bracket on the last carbon atom indicating that this carbon atom is bonded to the group $E^2$.

Whether for the group $E^2$ (when $E^1$ is a single bond) or the group $E^1$ (when $E^1$ is an organic spacer group), these groups can occupy any of the carbon atoms of the fluorinated phenylene group and in particular, the para position.

Regardless of the alternative retained, the fluorinated styrenic unit may comprise only fluorine atoms on free carbon atoms of the phenylene ring.

An example of a fluorinated styrenic unit is a unit having the following formula (IV):

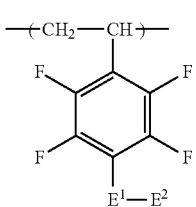

(IV)

wherein $E^1$, $E^2$ are such as defined hereinabove.

Even more specifically, fluorinated styrenic units that can enter into the constitution of grafted polymer chains are units that have the following formulas (V) to (VII):

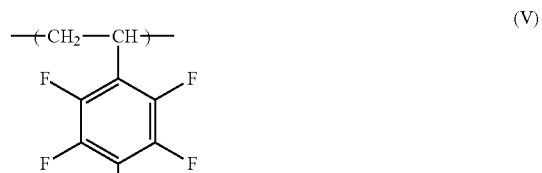

(V)

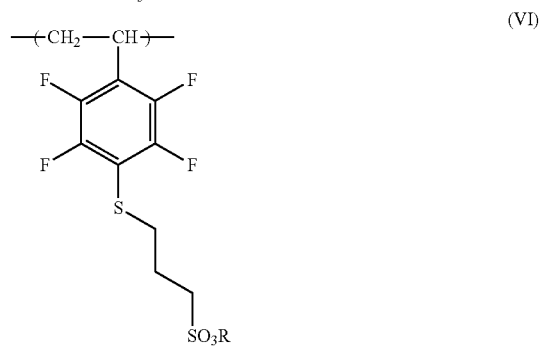

(VI)

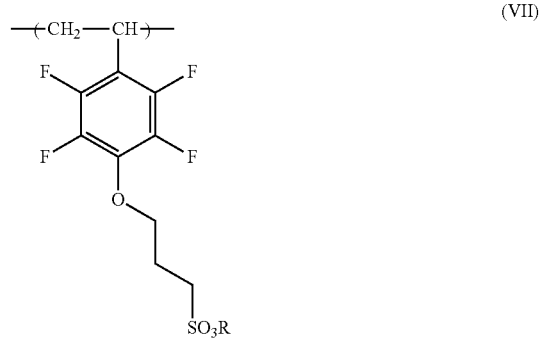

(VII)

wherein R is a hydrogen atom or a cation (for example, an alkali metal cation).

The polymer or polymers forming polymer chains can be formed solely of one or several fluorinated styrenic repetitive units carrying at least one proton-conducting group, optionally in the form of a salt even a single type of fluorinated styrenic repetitive unit carrying at least one proton-conducting group, optionally in the form of a salt, for example, a repetitive unit having formulas (V), (VI) or (VII) such as defined hereinabove, in which case these polymers can be qualified as homopolymers. The homopolymers can be particularly advantageous, because the particles thus grafted can have a swelling in the presence of water less than 10%.

Moreover, the polymer or polymers comprising at least one fluorinated styrenic repetitive unit carrying at least one proton-conducting group, optionally in the form of a salt, can also include at least one non-fluorinated styrenic repetitive unit carrying at least one proton-conducting group, optionally in the form of a salt.

In other words, if $Y^1$ is used to refer to the fluorinated styrenic repetitive unit or units carrying at least one proton-conducting group, optionally in the form of a salt, $Y^2$ the non-fluorinated styrenic repetitive unit or units carrying at least one proton-conducting group and X' the organic spacer group, the invention could also be defined as being particles bonded, covalently, to grafts having formula:

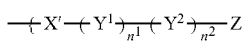

with $n^1$ corresponding to the repetition number of the repetitive unit between brackets, this repetition number being a positive whole number at least equal to 2, for example ranging from 2 to 3000, $n^2$ corresponding to the repetition number of the repetitive unit between brackets, this repetition number being equal to 0 or being a positive whole number at least equal to 2, for example, ranging from 2 to 5000, Z is an end-group, for example, a halogen atom, such as a chlorine atom, with the bracket indicating that the group X' is directly covalently bonded to a particle of silicon.

It is specified that the repetitive units $Y^1$ and $Y^2$ can be distributed randomly, in alternation or in sequence, which means respectively, in other terms, that the repetitive units $Y^1$ and $Y^2$ are randomly distributed in the polymer, the repetitive units $Y^1$ and $Y^2$ are alternating in the polymer or the repetitive units $Y^1$ and $Y^2$ are distributed in the form of blocks (namely, a block of repetitive units $Y^1$ and a block of repetitive units $Y^2$) in the polymer.

Said non-fluorinated styrenic repetitive unit or units can have the following formula (VIII):

wherein:
$Z^2$ corresponds to a non-fluorinated phenylene group; and
$E^3$ corresponds to a proton-conducting group, optionally in the form of a salt, such as a sulphonic acid group, a phosphonic acid group or a carboxylic acid group.

The group $E^3$ can occupy any of the carbon atoms of the non-fluorinated phenylene group and in particular, the para position.

A particular non-fluorinated styrenic repetitive unit is a repetitive unit coming from the polymerisation of a monomer of the family of the styrenesulfonic acids, said acids can be in the form of a salt, such as a sodium salt.

More specifically, an example of a non-fluorinated styrenic repetitive unit is a unit having the following formula (IX):

wherein R is a hydrogen atom or a cation (for example, an alkali metal cation).

In terms of the invention, each polymer chain is bonded to the particles of silica via at least one organic spacer group, i.e. an organic group forming a bridge between the particles and a polymer chain. This or these organic spacer groups are, conventionally, coming from an initiating compound of an ATRP polymerisation.

The organic spacer group or groups can be a hydrocarbon group having the form of a linear or branched chain, into which can be inserted one or several aromatic groups, such as, for example, a phenylene group.

More specifically, the organic spacer group or groups can have the following formula (X):

wherein:
$X^1$ is the group covalently bonded to a particle;
$R^1$ is an organic group forming a bridge between $X^1$ and $X^2$; and
$X^2$ is the group covalently bonded to a polymer chain.

More specifically, the group $X^1$ can be a group having the following formula (XI):

$X^3$ being an alkylene group, for example, a group comprising from 1 to 15 carbon atoms, such as an ethylene group;
the brackets present on the oxygen atoms indicating the locations of bonds with the particle (in other terms, the silanoxy group is bonded to the particle by three bonds via the oxygen atoms) and the bracket present on $X^3$ indicating the location by which is carried out the bond with $R^1$.

More specifically, the group $X^2$ can be an alkylene group, for example, a group comprising from 1 to 15 carbon atoms, such as a methylene group.

More specifically, the group $R^1$ can be an aromatic group, such as a phenylene group.

By way of example, the organic spacer group or groups can thus have the following formula (XII):

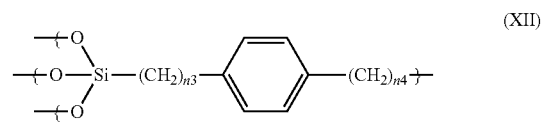

the brackets present on the oxygen atoms indicating the locations of bonds with the particle (in other terms, the silanoxy group is bonded to the particle by three bonds via the oxygen atoms) and the bracket present on the group $-(CH_2)_{n4}-$ indicating the location by which is carried out the bond with the polymer chain, while $n_3$ and $n_4$ correspond to the number of repetitions of units taken in brackets, with these numbers being whole numbers ranging from 1 to 15. For example, $n_3$ can be equal to 2 and $n_4$ can be equal to 1.

By way of examples, particles in accordance with the invention can be:
particles of silica bonded to polymer chains formed by polymers resulting from the chaining of a repetitive unit having formula (V) or (VI) such as defined hereinabove, with each one of said polymer chains being bonded to said particles via at least one organic spacer group having formula (XII) such as defined hereinabove;
particles of silica bonded to polymer chains formed by copolymers resulting from the chaining of a repetitive unit having formula (V) such as defined hereinabove and of a repetitive unit having formula (IX) such as defined hereinabove, with each one of said polymer chains being bonded to said particles via at least one organic spacer group having formula (XII) such as defined hereinabove;

particles of silica bonded to polymer chains formed by copolymers resulting from the chaining of a repetitive unit having formula (VI) such as defined hereinabove and of a repetitive unit having formula (IX) such as defined hereinabove, with each one of said polymer chains being bonded to said particles via at least one organic spacer group having formula (XII) such as defined hereinabove.

In other words, specific particles in accordance with the invention, can be particles of silica, bonded, covalently, to grafts having the formula:

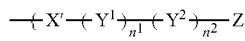

wherein:
X' is an organic spacer group having formula (XII) such as defined hereinabove;
$Y^1$ is a repetitive unit having formula (V) or (VI) such as defined hereinabove;
$Y^2$ is a repetitive unit having formula (IX) such as defined hereinabove;
Z is an end-group, for example, a halogen atom, such as a chlorine atom;
$n^1$ and $n^2$ are such as defined hereinabove.

It is specified that the repetitive units $Y^1$ and $Y^2$ can be distributed randomly, in alternation or in sequence, which means respectively, in other terms, that the repetitive units $Y^1$ and $Y^2$ are randomly distributed in the polymer, the repetitive units $Y^1$ and $Y^2$ are alternating in the polymer or the repetitive units $Y^1$ and $Y^2$ are distributed in the form of blocks (namely, a block of repetitive units $Y^1$ and a block of repetitive units $Y^2$) in the polymer.

The particles of the invention have, as indicated hereinabove, a proton conduction through the nature of the grafted polymer chains and also are not sensitive to the phenomenon of solubilisation and of elution through the nature of the fluorinated repetitive unit or units present in the polymer chains.

Consequently, these particles very naturally have application in the field of proton-conducting materials, such as the proton-conducting composite materials used, for example, for proton-conducting membranes that can be used in the field of fuel cells.

The invention therefore also has for object a conducting composite material comprising a polymeric matrix in which the particles are dispersed such as defined hereinabove.

The polymeric matrix can be a matrix made of a non-proton-conducting polymer and, more specifically, a fluorinated polymer.

Such polymers can be fluorinated polymers such as a polytetrafluoroethylene (PTFE), a polyvinylidene fluoride (PVDF), a copolymer of tetrafluoroethylene/ethylene (ETFE), a copolymer of vinylidene fluoride and of hexafluoropropene and the derivatives thereof. The fluorinated polymers have in particular for advantage having good mechanical resistance as well as good chemical resistance.

The composite material according to the invention advantageously has the form of a film, that has for example a thickness from 10 to 300 μm.

The aforementioned composite materials can be prepared by a method comprising the following steps:
mixing, in the presence of one or several organic solvents, the polymer or polymers forming the matrix with particles such as defined hereinabove;
forming, from the mixture obtained, a composite material by the evaporation of the solvent or solvents.

The mixture can be poured on a support, for example, made of glass, alumina or polyethylene, then the material in the form of a film is formed by the evaporation of the solvent or solvents. At the end of this method, a material is obtained in the form of a film deposited on the support. The film can easily be detached from the support, in order to give a self-supported proton-conducting film.

It is specified that the solvents that can be used in the framework of this method can be chosen from aprotic polar solvents, such as dimethylformamide, dimethylacetamide, tetrahydrofurane, dimethylsulfoxide, or chlorinated solvents such as chloroform, but also solvents such as alcohols, ethers, acetone.

At the end of the method, a step of acidification can be carried out, where applicable, in order to transform the proton-conducting groups in the form of salts into acid groups.

Due to their mechanical properties, these materials can be implemented effectively and lead to thin films that are sufficiently resistant to be used as membranes for fuel cells.

These membranes advantageously have the form of thin films, having, for example, a thickness from 10 to 300 micrometres.

These membranes advantageously have sufficient permeability to reactant gases (such as $H_2$ and $O_2$) and are stable, more preferably, to a temperature of at least 150° C.

Preferably, the composite material comprising the membrane comprises from 5 to 70% by weight of particles such as defined hereinabove.

It is specified that the % hereinabove are expressed in relation to the total weight of the composite material.

The membranes such as defined hereinabove can advantageously be incorporated into fuel cell devices.

Thus, the invention also relates to a device comprising at least one electrode-membrane-electrode assembly, wherein the membrane is such as defined hereinabove.

The fuel cell device generally comprises several electrode-membrane-electrode assemblies.

In order to prepare such an assembly, the membrane can be placed between two electrodes, for example made of fabric or of carbon paper soaked with a catalyst. The assembly formed from the membrane arranged between the two electrodes is then pressed at a suitable temperature so as to obtain good electrode-membrane adhesion.

The electrode-membrane-electrode assembly is then placed between two plates that provide the electrical conduction and the supplying of electrodes with reagents. These plates are commonly referred to by the term bipolar plates.

Finally, the invention also relates to a method for preparing particles such as defined hereinabove, said method comprising the following steps:

a) a step of putting into contact particles of silica with an initiating compound of a polymerisation of the ATRP type, said compound comprises at least one group able to be grafted to said particles, whereby particles grafted by the remainder of said initiating compound are obtained;

b) a step of putting into contact said particles obtained in a) with:
- at least one fluorinated styrenic monomer optionally carrying at least one proton-conducting group, optionally in the form of a salt; and
- optionally, at least one non-fluorinated styrenic monomer carrying at least one proton-conducting group, optionally in the form of a salt;

whereby there is a polymerisation of the ARTP type of said monomer or monomers from the aforementioned remainders;

c) when the repetitive unit coming from the polymerisation of the fluorinated styrenic monomer is not carrying at least one proton-conducting group, optionally in the form of a salt, a step of introducing on this repetitive unit of at least one proton-conducting group, optionally in the form of a salt, with the unit thus corresponding to a fluorinated styrenic repetitive unit carrying at least one proton-conducting group, optionally in the form of a salt.

The term polymerisation of the ATRP type means a radical polymerisation by the transfer of atoms (ATRP, or "Atom Transfer Radical Polymerisation"). The mechanism of this type of polymerisation shall be defined in more detail hereinbelow.

The term initiating compound of a polymerisation of the ATRP type means a compound comprising at least one group able to initiate this type of polymerisation, with the polymerisation initiating compound in accordance with the invention comprising, furthermore, a group able to be grafted (or in other words, able to be covalently bonded) to the aforementioned particles, which means, in other terms, that this group reacts in the presence of particles in order to be covalently fixed to the surface of the latter (this can also be referred to as grafting), whereby the initiator subsists on said particles in the form of a remainder, given that this remainder comprises at least one group able to initiate a polymerisation of the ATRP type.

As mentioned hereinbelow, the method of the invention comprises a step of putting into contact particles of silica with an initiating compound of a polymerisation of the ATRP type comprising a group able to be grafted to said particles, whereby particles grafted by a remainder of said compound (step a) are obtained.

This step of putting into contact can include an operation of dispersion of the aforementioned particles followed by an operation of putting the dispersion obtained into contact with an initiating compound such as defined hereinabove, said compound will react with the particle in order to form a covalent bond.

Regarding the initiating compound, the latter must comprise at least one group able to be grafted to the surface of said particles in order to form a covalent bond.

In particular, the groups of the initiating compound able to be bonded to the surface of the particles of silica in order to form a covalent bond, can be chosen from the groups having the following formulas:
- $COOR^2$ with $R^2$ representing an atom of hydrogen, an alkyl group comprising from 1 to 30 carbon atoms or a phenyl group;
- $COCl$;
- $COCH_2CO-R^2$ with $R^2$ representing an atom of hydrogen, an alkyl group comprising from 1 to 30 carbon atoms or a phenyl group;
- $PO(OH)_2$, $-PO(OR^3)(OH)$ or $-PO(OR^3)(OR^4)$ with $R^3$ and $R^4$, identical or different, representing an alkyl group comprising from 1 to 30 carbon atoms or a phenyl group;
- $CO(NHOH)$;
- $M(OR^5)_{n-x-1}Z'_x$ with x being a whole number ranging from 0 to (n−1), M being a metal or a metalloid, n being a degree of oxidation of M, $R^5$ representing an atom of hydrogen, an alkyl group comprising from 1 to 30 carbon atoms, a phenyl group, a monovalent metal cation, or a group having the formula $N^+R^2_4$, with $R^2$ representing an atom of hydrogen, an alkyl group comprising from 1 to 30 carbon atoms, or a phenyl group, and Z' represents a hydrogen atom, an alkyl group comprising from 1 to 30 carbon atoms, a phenyl group or a halogen atom;
- $SO_3M'$ with M' representing an atom of hydrogen, a monovalent metal cation or a group having the formula $N^+R^2_4$ with $R^2$ representing an atom of hydrogen, an alkyl group comprising from 1 to 30 carbon atoms or a phenyl group;
- $B(OM')_2$ with M' representing an atom of hydrogen, a monovalent metal cation or a group having the formula $N^+R^2_4$ with $R^2$ representing an atom of hydrogen, an alkyl group comprising from 1 to 30 carbon atoms or a phenyl group;
- $OH$;

and the combinations thereof.

For the group having the formula $-M(OR^5)_{n-x-1}Z'_x$ such as defined hereinabove, M can represent a metal element, such as a transition element with a given degree of oxidation n or a metalloid element such as Si, Ge, Te with a given degree of oxidation n, with the degrees of oxidation that can be considered for each metal or metalloid element being known to those skilled in the art.

As an example of groups that are in accordance with this definition, mention can be made of the group having the formula
$Si(OR^5)_{3-x}Z'_x$ with x being a whole number ranging from 0 to 3, Z' and $R^5$ having the same definitions as those given hereinabove.

More particularly, a suitable group can be an alkoxysilane group, such as a trimethoxysilane group, a triethoxysilane group.

The initiating compound used in the framework of the method of the invention is a polymerisation initiating compound of the ARTP type, which means, in other terms, that it also comprises a group able to generate a polymerisation, of the ARTP type, with this group able to be a —Z group, such as a halogen atom, such as chlorine. This Z group is, at the end of the polymerisation, as an end-group of the polymer.

Initiating Compounds that can be Used in the Framework of the Method of the Invention can be Compounds that have the Following Formula (XIII):

$$X_1'—R^1—X_2' \quad (XIII)$$

wherein:
- $X_1'$ is a group comprising a group able to be bonded, covalently, or in other words, to be grafted to a particle of silica (such as a group of those listed hereinabove);
- $R^1$ is an organic group forming a bridge between $X_1'$ and $X_2'$; and
- $X_2'$ is a group comprising a group able to generate a polymerisation of the ATRP type.

More specifically, the group $X_1'$ can be a group having the following formula (XIV):

$$(OR^5)_3Si—X^3— \quad (XIV)$$

$R^5$ and $X^3$ being such as defined hereinabove ($X^3$ being an alkylene group, for example, comprising from 1 to 15 carbon atoms, for example, an ethylene group).

More specifically, the group $R^1$ can be an aromatic group, such as a phenylene group, with the groups $X_1{}'$ and $X_2{}'$ able to be located in ortho, para or meta position from one another, and advantageously in para position.

More specifically, the group $X'^2$ can be an alkylene group, for example, a group comprising from 1 to 15 carbon atoms, such as a methylene group, said alkylene group being a carrier of an end-group, such as a halogen atom, such as a chlorine atom.

By way of example, the initiating compound can thus have the following formula (XV):

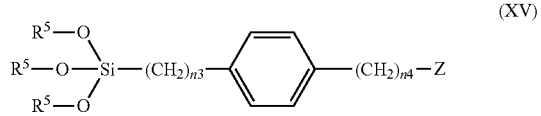

(XV)

wherein $R^5$, $n_3$ and $n_4$ are such as defined hereinabove and Z is a halogen atom.

Even more specifically, the ATRP polymerisation initiating compound can be chloromethylphenylethyltrimethoxysilane having the following formula (XVI):

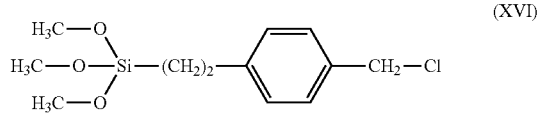

(XVI)

At the end of the step a), by way of example, when the initiating compound is chloromethylphenylethyltrimethoxysilane, the silica particles are particles of silica bonded, covalently, to remainders of said initiating compound, with these remainders having the following formula (XVII):

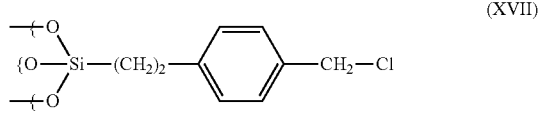

(XVII)

the brackets present on the oxygen atoms indicating the locations of bonds with the particle (in other terms, the silanoxy group is bonded to the particle by three bonds via the oxygen atoms).

After the step a), the method of the invention comprises a step of putting into contact said particles obtained in a) with:
- at least one fluorinated styrenic monomer optionally carrying at least one proton-conducting group, optionally in the form of a salt; and
- optionally, at least one non-fluorinated styrenic monomer carrying at least one proton-conducting group, optionally in the form of a salt;

whereby there is a polymerisation of the ARTP type of said monomer or monomers from the aforementioned remainders.

According to a particular embodiment of the invention, the step b) implies fluorinated styrenic monomer, which is not carrying at least one proton-conducting group, optionally in the form of a salt (which means, in other terms, that the method of the invention will comprise, in addition, the implementing of the step c)) and, optionally, a non-fluorinated styrenic monomer carrying at least one proton-conducting group, optionally in the form of a salt.

This step is governed by the mechanisms of the ATRP polymerisation, which operates on the principle of the reversible and rapid formation of species referred to as "dormant species" by the creation of a covalent bond with a reactive radical species.

The remainders of the initiating compound covalently bonded to the particles of silica include at least one group able to initiate the ATRP polymerisation, i.e. a group able to be cleaved on a bond in order to form a first radical species and a second radical species, with the first radical species reacting afterwards, with a first carbon carrying a double bond belonging to the monomer or monomers, the second radical species being fixed to a second atom opposite the first carbon carrying the double bond.

In other terms, this mechanism can be summarised according to the following reaction scheme:

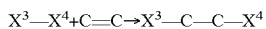

$X^3$—$X^4$ corresponding to the remainder of the aforementioned initiator with $X^3$ corresponding to the first species and $X^4$ corresponding to the second species, with the species $X^3$—C—C—$X^4$ being a dormant species, which can grow via the successive additions of monomers on free radicals, as in a conventional radical polymerisation, with the free radicals being created by departure of the group $X^4$, which is then fixed after insertion of the monomer to the end of the polymer chain, which still forms a dormant species that can continue to increase when monomers subsist in the polymerisation medium.

For reasons of simplicity, we have shown hereinabove only the double bond of the monomer.

The fluorinated styrenic monomer able to be used in the framework of the step b) can be a monomer having the following formula (XVIII):

(XVIII)

$Z^1$ corresponds to a fluorinated phenylene group; and
$E^1$ corresponds to a single bond or an organic spacer group;
$E^2$ corresponds to a proton-conducting group, optionally in the form of a salt, such as a sulphonic acid group, a phosphonic acid group or a carboxylic acid group;
$n_5$ is equal to 0 or to 1.

When $n_5$ is equal to 0, this means that -$E^1$-$E^2$ does not exist and that the formula is summarised as the following formula (XIX):

(XIX)

the vacant position left by the absence of -$E^1$-$E^2$ on the group $Z^1$ being occupied by a fluorine atom on this group $Z^1$.

When $n_5$ is equal to 1, this means that -$E^1$-$E^2$ is present and that the formula can be thus summarised as the following formula (XX):

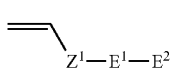

(XX)

According to an alternative, as already explained for the definition of the polymers as such, $E^2$ can be bonded directly to $Z^1$ and, more specifically, to a carbon atom of the fluorinated phenylene group, when $E^1$ is a single bond. For example, $E^2$ can be located in a para position on this fluorinated phenylene group.

According to another alternative, $E^2$ can be bonded to $Z^1$ via an organic spacer group $E^1$, itself bonded to a carbon atom of the fluorinated phenylene group, for example, in para position on this fluorinated phenylene group.

$E^1$, when it is an organic spacer group, can be an alkylene group, a —S-alkylene group or an —O-alkylene group (in these latter two cases, the S atom and the O atom are directly bonded to the fluorinated phenylene group), said alkylene groups being able to comprise from 1 to 4 carbon atoms, such as a methylene group, an ethylene group, a propylene group, a butylene group.

More specifically, $E^1$, when it is an organic spacer group, can be a —O-propylene group having the following formula (II):

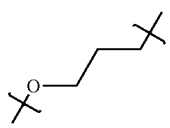

(II)

with the bracket on the oxygen atom indicating the location by which the oxygen atom is bonded to the fluorinated phenylene group and the bracket on the last carbon atom indicating that this carbon atom is bonded to the group $E^2$.

Whether for the group $E^2$ (when $E^1$ is a single bond) or the group $E^1$ (when $E^1$ is an organic spacer group), these groups can occupy any of the carbon atoms of the fluorinated phenylene group and in particular, the para position.

Regardless of the alternative retained, the fluorinated styrenic monomer may comprise only fluorine atoms on free carbon atoms of the phenylene ring.

An example of a fluorinated styrenic monomer is a monomer having the following formula (XXI):

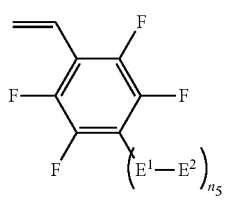

(XXI)

wherein $E^1$, $E^2$, $n_5$ are such as defined hereinabove, with for particularity that, when $n_5$ is equal to 0, the vacant position left by the absence $-E^1-E^2$ is occupied by a fluorine atom.

Even more specifically, particular examples of fluorinated styrenic monomers are the monomers that have the following formulas (XXII) and (XXIII):

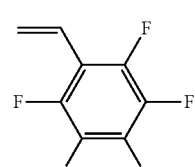

(XXII)

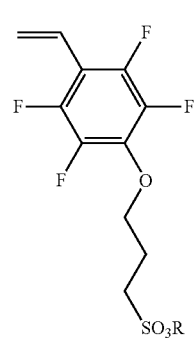

(XXIII)

wherein R is a hydrogen atom or a cation (for example, an alkali metal cation).

These monomers, when they are not available commercially, can be the object of a prior preparation via conventional synthetic routes of organic chemistry.

Thus, for example, when it is a question of preparing a monomer having formula (XXIII) hereinbelow, the latter can be prepared by the reaction of a hydroxyl tetrafluorostyrene with, in a first temps, a base for forming a hydroxylate, which will react with a sultone compound (more specifically, 1,3-propanesultone) in order to form the aforementioned monomer, with the mechanism of the reaction consisting in a nucleophilic addition of the hydroxylate with the sultone compound thus causing an opening of a ring.

When it is present, the non-fluorinated styrenic monomer can have the following formula (XXIV):

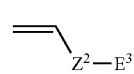

(XXIV)

wherein:
$Z^2$ corresponds to a non-fluorinated phenylene group; and
$E^3$ corresponds to a proton-conducting group, optionally in the form of a salt, such as a sulphonic acid group, a phosphonic acid group or a carboxylic acid group.

A specific monomer that satisfies the definition given hereinabove is a styrenesulfonic acid monomer, for example in the form of a salt, such as a sodium salt (in which case, this can be referred to as a sodium styrenesulfonate monomer).

An example of this type of monomer is a monomer having the following formula (XXV):

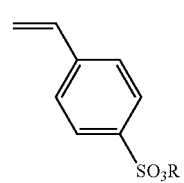

(XXV)

wherein R is a hydrogen atom or a cation (for example, an alkali metal cation or an ammonium cation).

Preferably, R is an ammonium cation, such as a tetraalkylammonium cation (for example, a tetramethylammonium cation, a tetraethylammonium cation, a tetra-n-butylammonium cation), with the use of such a cation allowing for a better solubilisation of the monomer in the polymerisation solvent, in particular when the latter is dimethylsulfoxide. Generally, for R, all types of organic cations can be used, that allow for good solubilisation of the monomer in the polymerisation solvent.

The fluorinated styrenic monomer or monomers optionally carrying at least one proton-conducting group, optionally in the form of a salt and the non-fluorinated styrenic monomer or monomers carrying at least one proton-conducting group, optionally in the form of a salt can be present in a weight ratio ranging from 100/0 to 1/99, and more specifically 90/10.

In addition to the presence of one or several monomers such as defined hereinabove, the step of preparation can unfold, conventionally, in the presence of a metal salt (for example, a metal halide, such as a copper halide, such as copper chloride) and of an organic ligand.

It is specified that, by organic ligand, this means an organic compound comprising at least one free doublet able to fill in an electronic gap of a metal element (here, in our case, an electronic gap on the metal element of the aforementioned salt) in order to form a metal complex.

By way of example, a suitable organic ligand can be a compound that belongs to the family of pyridine compounds, such as bipyridine.

The step of preparation of the polymer can be carried out, furthermore, in an aprotic apolar solvent, such as a sulfoxide solvent, in particular when the polymerisation entails a fluorinated styrenic monomer, of which the proton-protecting group or groups are introduced afterwards during the step b), during a suitable temperature and duration in order to generate the polymerisation, for example, a temperature of 80° C.

Furthermore, the step of preparation of the polymer can be followed by a step of hydrolysis intended to protonate the proton-conducting groups, when they are present in the form of a salt (or, in other terms, this step consists in replacing the cations of the salt with hydrogen atoms).

The average molecular weights of the polymers obtained at the end of the step b) can range from 2000 to 1,000,000 g/mol, more preferably from 10,000 to 300,000 g/mol.

Advantageously, when the polymer comprises at least one repetitive unit coming from the polymerisation of one or several non-fluorinated styrenic monomers, the proportion of said repetitive unit is less than that of the repetitive unit coming from the polymerisation of the fluorinated styrenic monomer or monomers.

After the step b), the method comprises, where applicable, when the repetitive unit coming from the polymerisation of the fluorinated styrenic monomer is not carrying at least one proton-conducting group, optionally in the form of a salt, a step of introducing on this repetitive unit of at least one proton-conducting group, possibly in the form of a salt.

This proton-conducting group can be introduced directly on the phenylene ring of the styrenic repetitive unit or via an organic spacer group, which means that the organic spacer group is directly bonded to the phenylene ring and forms a bridge between the phenylene ring and the proton-conducting group, optionally in the form of salts.

This introduction can be carried out by all suitable chemical synthesis routes.

Thus, by way of example, when the repetitive unit comes from the polymerisation of the pentafluorostyrene monomer and the proton-conducting group intended to be introduced is a sulphonic acid group bonded directly to the phenylene ring, the step of introduction can comprise the following operations:

a sulphuration operation of the benzene ring consisting in a substitution of a fluorine atom with a —S—R group with R representing an atom of hydrogen or a cation, such as an alkali metal cation; and an oxidation operation of the sulphur group in order to form a —SO$_3$R group with R being such as defined hereinabove.

More precisely, the sulphuration operation can consist in causing to react, in an alkali medium, hydrated sodium hydrogenosulfide in dimethylsulfoxide, allowing for the introduction of a —S—Na group, for example, in para position.

As for the oxidation operation of the sulphide group, it can take place, in the presence of an oxidant, such as oxygenated water.

Alternatively, when the repetitive unit comes from the polymerisation of the pentafluorostyrene monomer and the proton-conducting group intended to be introduced is a sulphonic acid group bonded to an organic spacer group, the step of introduction can comprise the following operations:

a sulphuration operation of the benzene ring consisting in a substitution of a fluorine atom with a —S—R group with R representing an atom of hydrogen or a cation, such as an alkali metal cation;

a nucleophilic addition operation of the —S—R group on a sultone compound thus generating a ring opening, whereby there is the formation of a -E$^1$-SO$_3$R group, with E$^1$ being an organic spacer group of the —S-alkylene type.

More precisely, this can be a nucleophilic addition reaction, in an alkali medium, of a sodium thiolate group on a 1,3-propanesultone compound, resulting in a ring opening and thus forming a —S—CH$_2$—CH$_2$—CH$_2$—SO$_3$Na group.

The invention shall now be described, in relation to the following examples given for the purposes of information and in a non-limiting manner.

DETAILED EXPOSURE OF PARTICULAR EMBODIMENTS

Example 1

This example shows the preparation of the particles of silica covalently bonded to a polymerisation initiator of the ATRP type according to the following reaction scheme:

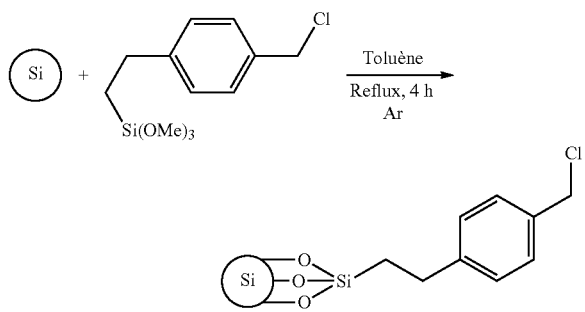

Silica (6 g, is about 0.02 mol of silanol on the surface) and toluene (500 mL) are introduced in a bicol under an argon flow. The resulting mixture is passed through ultrasound, in order to disperse the silica well in the toluene. Then the mixture is brought to reflux. Chloromethylphenylethyltrimethoxysilane (10 g, 0.036 mol) is introduced drop by drop into the mixture. The reflux is left for 4 hours.

The functionalised particles of silica are then isolated via centrifugation then purified by two successive dispersion/centrifugation cycles in ethanol and acetone.

The recovered particles of silica are then dried in the oven at 80° C. for one night.

Example 2

This example shows the ATRP polymerisation of 2,3,4,5,6-pentafluorostyrene from functionalised particles of silica obtained in the example 1.

The reaction scheme is as follows:

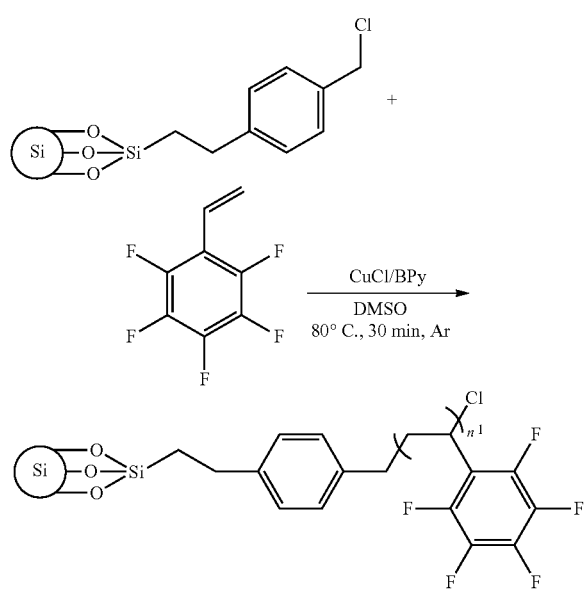

BPy corresponding to the bipyridine and DMSO to the dimethylsulfoxide and $n^1$ corresponding to the repetition number of the repetitive unit between brackets.

The 2,3,4,5,6-pentafluorostyrene is distilled beforehand and the polymerisation reactor is heated in a vacuum (3 heating/cooling cycles) before use.

Dimethylsulfoxide (DMSO) (200 mL) is degassed in a vacuum by bubbling the argon for 15 minutes in a bicol. The distilled 2,3,4,5,6-pentafluorostyrene (10 g) and the silica obtained at the end of the example 1 (2 g) are then introduced under argon flow into the bicol. Two vacuum/argon cycles are carried out then argon is set to bubble in the mixture.

When the silica is perfectly dispersed in the mixture, bipyridine (0.05 M) and copper chloride (0.08 M) are introduced under an argon flow. Three vacuum/argon cycles are finally carried out.

Then the bicol is set in place under stirring in an oil bath preheated to 80° C. After about 30 minutes of polymerisation, the mixture becomes very viscous and the stirring becomes difficult. The reaction is then stopped by the venting of the system. The mixture changes from a brown colour to a green colour.

The mixture is diluted with tetrahydrofurane (THF) for about 2 hours, so as to obtain a liquid solution.

The particles are precipitated in isopropanol, solubilised in THF, then reprecipitated twice in water with strong stirring.

The particles are then dried in the oven at 60° C. for one night and have the form of a white solid.

Example 3

This example shows the preparation of a sulphur polymer obtained by sulphuration of the polymer grafted on the silica obtained in the example 2.

The reaction scheme is as follows:

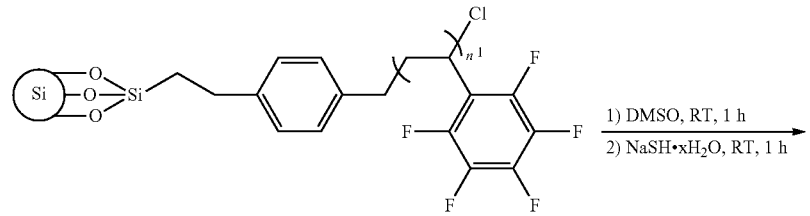

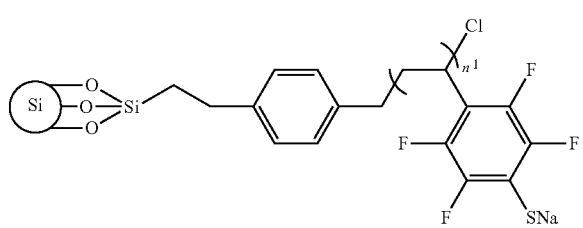

DMSO corresponding to the dimethylsulfoxide, RT corresponding to the ambient temperature and $n^1$ corresponding to the repetition number of the repetitive unit between brackets.

The grafted particles obtained in the example 2 are dispersed in DMSO (200 mL) in a flask at ambient temperature for 1 hour, the particles thus dispersed undergo a phenomenon of swelling. Then hydrogen sulphate monohydrate (1.2 eq. in relation to the number of moles of monomer units) is introduced little by little into the flask still at ambient temperature.

A first colorimetric transition is observed from pale yellow to blue then a disappearance of the blue coloration.

The reaction mixture then changes after 30 minutes to a green colour and, at the end of the reaction, the mixture has a blue homogenous colour.

The reaction mixture has, at the end of the reaction, a very high viscosity. It is diluted in water than is precipitated twice with isopropanol.

The product coming from the reprecipitation is dried via lyophilisation and has the form of a yellow solid.

Example 4

This example shows the preparation of a sulphur polymer obtained by sulphonation of the grafted polymer obtained in the example 3.

The reaction scheme is as follows:

RT corresponding to the ambient temperature and n corresponding to the repetition number of the repetitive unit between brackets.

In a 100 mL flask, the product obtained in the example 3 (2 g) is put into suspension in formic acid for 30 minutes. The flask is then placed in an ice bath. After 15 minutes, hydrogen peroxide (2 eq. in relation to the number of monomer units) is introduced drop by drop. The mixture is then placed at ambient temperature for 18 hours then at reflux for 5 hours.

The product is precipitated in isopropanol then is added into an aqueous solution of sodium hydroxide (1 M). The mixture is then stirred for 24 hours. The product is filtered and rinsed with isopropanol. The final product is placed in the oven at 60° C. for one night.

Example 5

This example shows the preparation of a sulphonated polymer comprising a sulphur organic spacer group obtained by sulphonation of the grafted polymer of the example 3 according to the following reaction scheme:

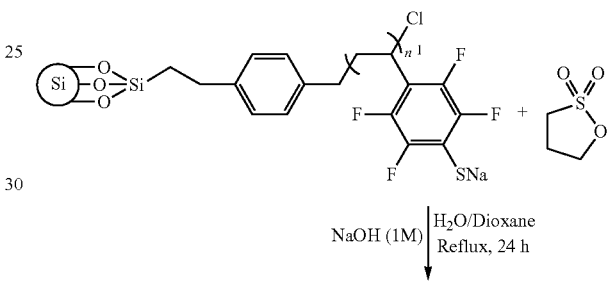

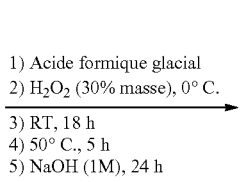

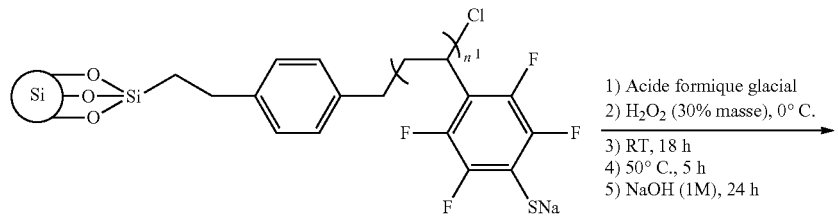

1) Acide formique glacial
2) H₂O₂ (30% masse), 0° C.
3) RT, 18 h
4) 50° C., 5 h
5) NaOH (1M), 24 h

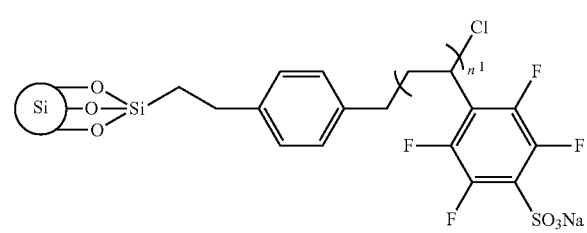

-continued

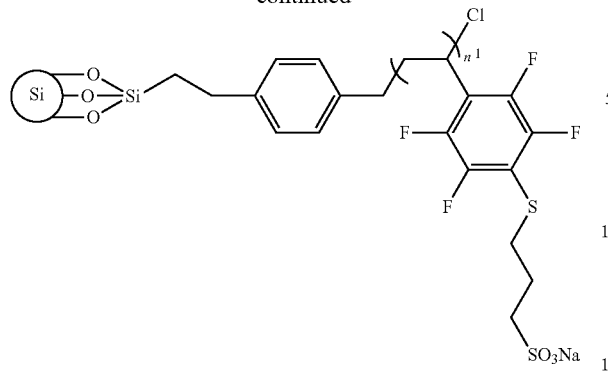

In a flask, the product obtained in the example 3 (1 g) is put into suspension in soda at 1M (25 mL) at ambient temperature for 1 hour. 1,3-propanesultone (1.2 eq. in relation to the number of moles of monomer units) is diluted in dioxane (5 mL) then introduced drop by drop at ambient temperature. The mixture is then set to reflux for 24 hours.

The mixture is filtered and wash with water. A colourless gel is obtained.

The product is dried in the oven at 60° C. for one night.

Example 6

This example shows the ATRP polymerisation of 2,3,4,5,6-pentafluorostyrene and of tetra-n-butylammonium styrenesulphonate from functionalised particles of silica obtained in the example 1.

The reaction scheme is as follows:

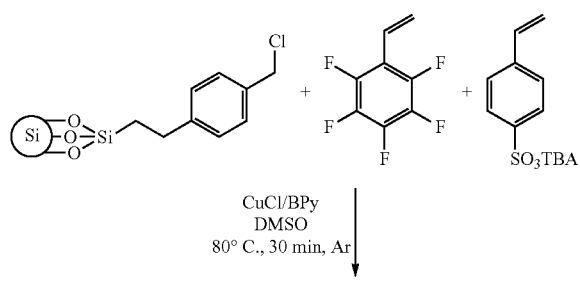

-continued

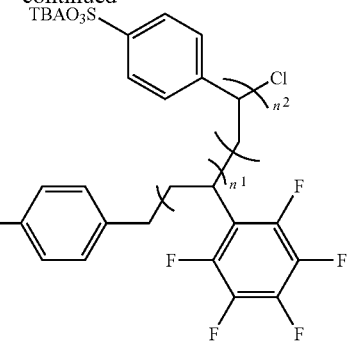

BPy corresponding to the bipyridine, DMSO to the dimethylsulfoxide, TBA corresponding to tetra-n-butylammonium and $n^1$ and $n^2$ corresponding to the repetition numbers of the repetitive units between brackets.

The 2,3,4,5,6-pentafluorostyrene is distilled beforehand and the polymerisation reactor is heated in a vacuum (3 heating/cooling cycles) before use.

The tetra-n-butylammonium styrenesulphonate is prepared by cation exchange between the hydrogen of the tetra-n-butylammonium and the sodium ion of the sodium styrenesulphonate.

Dimethylsulfoxide (DMSO) (200 mL) is degassed in a vacuum by bubbling the argon for 15 minutes in a bicol. The distilled 2,3,4,5,6-pentafluorostyrene (5 g), the tetra-n-butylammonium styrenesulphonate (5 g) and the silica obtained at the end of the example 1 (2 g) are then introduced under argon flow into the bicol. Two vacuum/argon cycles are carried out then argon is set to bubble in the mixture.

When the silica is perfectly dispersed in the mixture, bipyridine (0.05 M) and copper chloride (0.08 M) are introduced under an argon flow. Three vacuum/argon cycles are finally carried out.

Then the bicol is placed under stirring in an oil bath preheated to 80° C. After about 4 hours of polymerisation, the mixture becomes very viscous and the stirring becomes difficult. The reaction is then stopped by the venting of the system. The mixture changes from a brown colour to a green colour.

The mixture is diluted with tetrahydrofurane (THF) for about 2 hours, so as to obtain a liquid solution.

The particles are precipitated in isopropanol, solubilised in THF, then reprecipitated twice in water with strong stirring.

The particles are then dried in the oven at 60° C. for one night and have the form of a white solid.

Example 7

This example shows the preparation of a sulphur polymer obtained by sulphuration of the polymer grafted on the silica obtained in the example 6.

The reaction scheme is as follows:

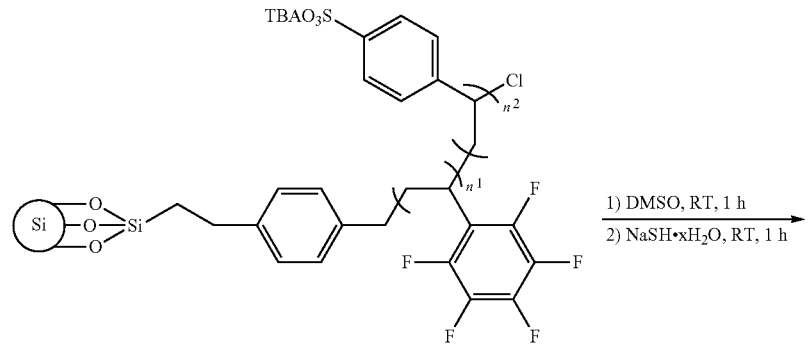

-continued

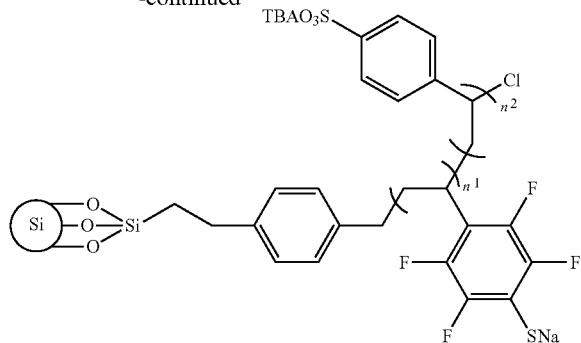

The conditions for carrying out this preparation are identical to those of the example 3.

Example 8

This example shows the preparation of a sulphur polymer obtained by sulphonation of the grafted polymer obtained in the example 7.

The reaction scheme is as follows:

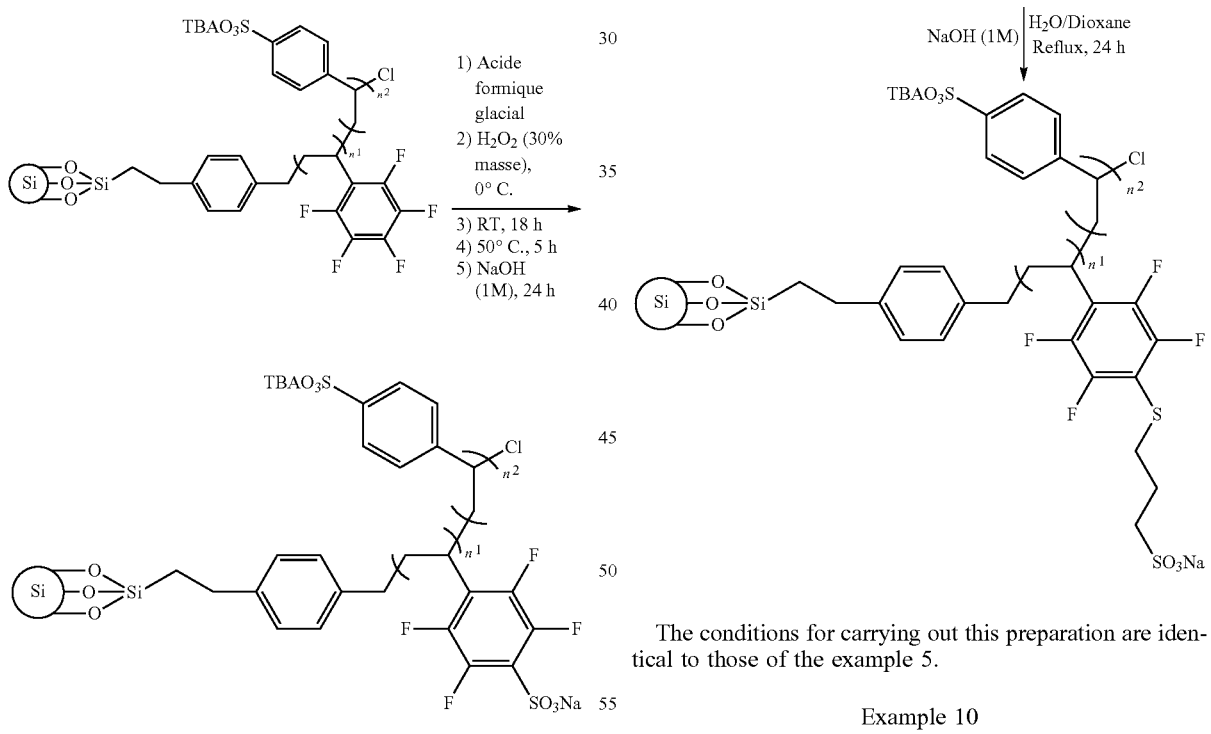

The conditions for carrying out this preparation are identical to those of the example 4.

Example 9

This example shows the preparation of a sulphonated polymer comprising a sulphur organic spacer group obtained by sulphonation of the grafted polymer of the example 7 according to the following reaction scheme:

The conditions for carrying out this preparation are identical to those of the example 5.

Example 10

In this example is shown the preparation of membranes from particles of the examples 4, 5, 8 and 9.

To do this, in a 50 mL Erlenmeyer flask, a copolymer of vinylidene fluoride and of hexafluoropropene (known as the abbreviation poly(VDF-co-HFP) (1 g) is introduced. Then the particles concerned (1.631 g) and dimethylsulfoxide (26 g) are introduced into the Erlenmeyer flask.

The resulting mixture is heated under moderate stirring at 60° C., in order to accelerate the solubilisation of the poly(VDF-co-HFP) and of the particles. The mixture is then passed through ultrasound for 45 minutes, in order to dissociate the particle aggregates. A yellow solution results.

The solution, after having been degassed, is poured onto a glass plate cleaned beforehand with methanol and finally with acetone, with the pouring being carried out using a manual applicator of the "Hand coater" type provided with an air-gap of 500 μm. The glass plate, on which the solution was poured, is placed on a plate heated to 110° C., still under a laminar flow hood, for a few hours in order to evaporate the solvent. Use of the laminar flow hood for the pouring and the evaporation is justified in order to prevent the introduction of dusts into the membranes.

After having been detached from the glass plate, the membrane is dried then is put into contact, under moderate stirring, with a concentrated solution of sulphuric acid at 98% at ambient temperature for 4 days.

The membrane is then rinsed three times with distilled water and dried at ambient temperature between several absorbent papers.

As mentioned hereinabove, this protocol was carried out respectively with the particles obtained in the examples 4, 5, 8 and 9.

The membranes obtained with these particles were subjected to a thermohydric ageing test by immersing them in water at 80° C. for 5 days. The gravimetric reading of the membranes at the end of this immersion shows no loss of weight of the membrane. The IR analyses carried out with the membranes reveal, moreover, the presence of organic functions associated with the polymer present on the particles.

These results attest that the fluoration of the conducting polymer makes it possible to prevent the elution of the particles within the membranes.

For the purposes of information, the membranes that do not contain fluorinated polymer lose up to 30% of their weight at the end of the thermohydric ageing test.

What is claimed is:

1. Particles of silica bonded to polymer chains constituted of at least one polymer comprising at least one fluorinated styrenic repetitive unit carrying at least one proton-conducting group, optionally in the form of a salt, with the bond between said particles and each one of these chains being carried out via at least one organic spacer group.

2. Particles of silica according to claim 1, wherein the fluorinated styrenic repetitive unit or units have the following formula (I):

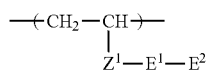
(I)

$Z^1$ corresponds to a fluorinated phenylene group; and
$E^1$ corresponds to a single bond or an organic spacer group;
$E^2$ corresponds to a proton-conducting group, optionally in the form of a salt.

3. Particles of silica according to claim 2, wherein $E^1$ is a single bond.

4. Particles of silica according to claim 2, wherein $E^1$, when it is an organic spacer group, is an alkylene group, a —S-alkylene- group or an —O-alkylene group.

5. Particles of silica according to claim 1, wherein the fluorinated styrenic unit is a unit having the following formula (IV):

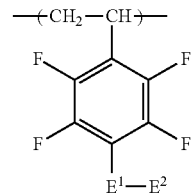
(IV)

$E^1$ corresponds to a single bond or an organic spacer group; and
$E^2$ corresponds to a proton-conducting group, optionally in the form of a salt.

6. Particles of silica according to claim 1, wherein the fluorinated styrenic unit has one of the following formulas (V), (VI) or (VII):

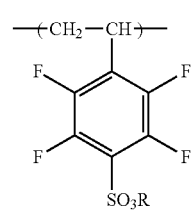
(V)

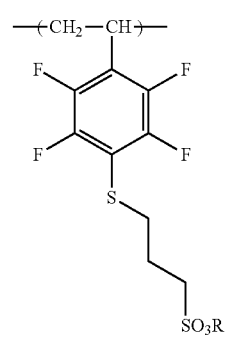
(VI)

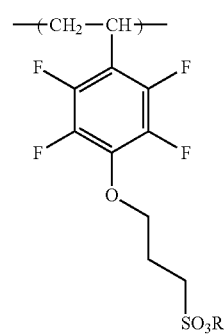
(VII)

wherein R is a hydrogen atom or a cation.

7. Particles of silica according to claim 1, wherein the polymer comprising at least one fluorinated styrenic repetitive unit carrying at least one proton-conducting group, optionally in the form of a salt, also comprises at least one non-fluorinated styrenic repetitive unit carrying at least one proton-conducting group, optionally in the form of a salt.

8. Particles of silica according to claim 7, wherein the non-fluorinated styrenic repetitive unit or units have the following formula (VIII):

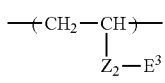
(VIII)

wherein:
Z² corresponds to a non-fluorinated phenylene group; and
E³ corresponds to a proton-conducting group, optionally in the form of a salt.

9. Particles of silica according to claim 7, wherein the non-fluorinated styrenic repetitive unit is a repetitive unit coming from the polymerisation of a monomer of the family of the styrenesulphonic acids, said acids can be in the form of a salt.

10. Particles of silica according to claim 7, wherein said non-fluorinated styrenic repetitive unit is a unit having the following formula (IX):

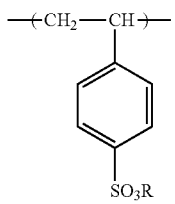
(IX)

wherein R is a hydrogen atom or a cation.

11. Particles of silica according to claim 1, wherein the organic spacer group or groups have the following formula (X):

—X¹—R¹—X² (X)

wherein:
X¹ is the group covalently bonded to the particles;
R¹ is an organic group forming a bridge between X¹ and X²; and
X² is the group covalently bonded to a polymer chain.

12. Particles of silica according to claim 11, wherein the group X¹ is a group having the following formula (XI):

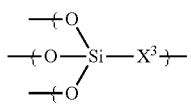
(XI)

X³ being an alkylene group;
the brackets present on the oxygen atoms indicating the locations of bonds with the particle and the bracket has on X³ indicating the location by which is carried out the bond with R¹.

13. Particles of silica according to claim 11, wherein the group X² is an alkylene group.

14. Particles of silica according to claim 11, wherein the group R¹ is an aromatic group.

15. Particles of silica according to claim 11, wherein the organic spacer group or groups have the following formula (XII):

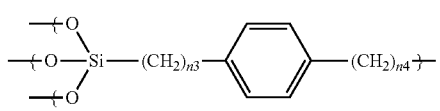
(XII)

the brackets present on the oxygen atoms indicating the locations of bonds with the particle and the bracket present on the group —(CH₂)$_{n4}$— indicating the location by which is carried out the bond with the polymer chain, while $n_3$ and $n_4$ correspond to the number of repetitions of units taken in brackets, with these numbers being whole numbers ranging from 1 to 15.

16. Particles of silica according to claim 1, which are:
particles of silica bonded to polymer chains formed by polymers resulting from the chaining of a repetitive unit having formula (V) or (VI):

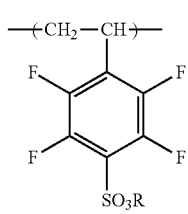
(V)

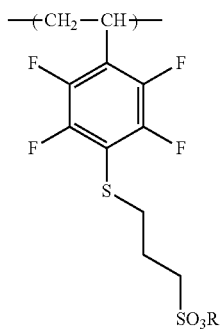
(VI)

with each one of said polymer chains being bonded to said particles via at least one organic spacer group having formula (XII):

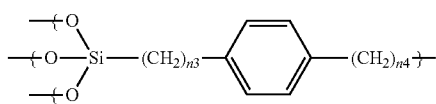
(XII)

the brackets present on the oxygen atoms indicating the locations of bonds with the particle and the bracket present on the group —(CH₂)$_{n4}$— indicating the location by which is carried out the bond with the polymer chain, while $n_3$ and $n_4$ correspond to the number of repetitions of units taken in brackets, with these numbers being whole numbers ranging from 1 to 15;

particles of silica bonded to polymer chains formed by copolymers resulting from the chaining of a repetitive unit having formula (V) as defined above and of a repetitive unit having formula (IX):

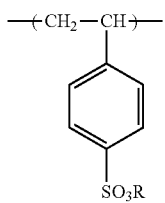

(IX)

with each one of said polymer chains being bonded to said particles via at least one organic spacer group having formula (XII) as defined above; or particles of silica bonded to polymer chains formed by copolymers resulting from the chaining of a repetitive unit having formula (VI) as defined above and of a repetitive unit having formula (IX) as defined above, with each one of said polymer chains being bonded to said particles via at least one organic spacer group having formula (XII) as defined above.

17. Proton-conducting composite material comprising a polymeric matrix within which particles are dispersed as defined according to claim 1.

18. Conducting composite material according to claim 17, wherein the polymeric matrix is a non-proton-conducting polymer.

19. Composite material according to claim 18, wherein the non-proton-conducting polymer is a fluorinated polymer.

20. Fuel cell membrane comprising a conducting composite material as defined according to claim 17.

21. Fuel cell device comprising at least one electrode-membrane-electrode assembly, wherein the membrane is as defined according to claim 20.

22. Method for preparing particles as defined in claim 1, said method comprising the following steps:
   a) a step of putting into contact particles of silica with an initiating compound of a polymerisation of the ATRP type, said compound comprises at least one group able to be grafted to said particles, whereby particles grafted by the remainder of said initiating compound are obtained;
   b) a step of putting into contact said particles obtained in a) with:
      at least one fluorinated styrenic monomer optionally carrying at least one proton-conducting group, optionally in the form of a salt; and
      optionally, at least one non-fluorinated styrenic monomer carrying at least one proton-conducting group, optionally in the form of a salt;
   whereby there is a polymerisation of the ARTP type of said monomer or monomers from the aforementioned remainders;
   c) when the repetitive unit coming from the polymerisation of the fluorinated styrenic monomer is not carrying at least one proton-conducting group, optionally in the form of a salt, a step of introducing on this repetitive unit of at least one proton-conducting group, optionally in the form of a salt, with the unit thus corresponding to a fluorinated styrenic repetitive unit carrying at least one proton-conducting group, optionally in the form of a salt.

\* \* \* \* \*